United States Patent [19]

Lippert, Jr.

[11] 4,180,372

[45] Dec. 25, 1979

[54] WIND ROTOR AUTOMATIC AIR BRAKE

[75] Inventor: Joseph Lippert, Jr., Locust Valley, N.Y.

[73] Assignee: Grumman Corporation, Bethpage, N.Y.

[21] Appl. No.: 773,538

[22] Filed: Mar. 2, 1977

[51] Int. Cl.² .............................................. F03D 7/04
[52] U.S. Cl. ...................................... 416/23; 416/41; 416/132 B
[58] Field of Search ............... 416/132 B, 23, 24, 169, 416/41, 48, 50

[56] References Cited

U.S. PATENT DOCUMENTS

| 932,521 | 8/1909 | Wallace | 416/132 B |
|---|---|---|---|
| 1,537,401 | 5/1925 | Blumschein | 416/132 B |
| 2,037,528 | 4/1936 | Miller | 416/132 B |
| 2,076,520 | 4/1936 | Swanson | 416/132 B |
| 2,148,921 | 2/1939 | Allen | 416/23 |
| 3,038,543 | 6/1962 | Davidson | 416/132 B |
| 3,448,811 | 6/1969 | Derschmidt | 416/24 |
| 3,874,816 | 4/1975 | Sweeney et al. | 416/41 X |

FOREIGN PATENT DOCUMENTS 800890  9/1958  United Kingdom ..................... 416/23

Primary Examiner—Everette A. Powell, Jr.
Attorney, Agent, or Firm—Mellor A. Gill

[57] ABSTRACT

A spring-loaded pivoting end plate that is hinged such that it is deployed by centrifugal force into the airstream to thereby act as an aerodynamic brake for wind turbines in overspeed conditions. The brake has a stationary portion fixed on the tip of the turbine rotor and a pivoting portion hinged for movement with respect to the fixed portion. The longitudinal centerline of the brake coincides with the chord line of the turbine blade and the pivoting movement is about a hinge axis that is normal to the rotational plane of the turbine. The planform of the brake has a low aspect ratio shape with the ratio of the fore and aft chordwise length to the width being one or greater. The edges of the brake in the normal running condition extend beyond the contour of the turbine blade to serve as an end plate such that the aerodynamic efficiency of the blade is improved thereby.

13 Claims, 7 Drawing Figures

WIND ROTOR AUTOMATIC AIR BRAKE

BACKGROUND OF THE INVENTION

Field of the Invention

The present invention relates to wind motors such as wind turbines and the like, and, more particularly, to an automatic aerodynamic brake for preventing overspeeding in such wind motors.

SUMMARY OF THE INVENTION

This invention lies in the art of rotational speed limiters for wind motors. A conventional windmill rotor with no load on it will rotate at a speed approximately proportional to the free wind speed. Because a rotor in high winds can turn at rotational speeds that are great enough to result in structural damage and possible failure due to centrifugal forces, means generally are provided to prevent overspeeding of the rotor. These means can take various forms such as, for example, the human operator in old-time Dutch-type windmills whose duty it was to furl the sails, or to turn the whole rotor out of the wind when storm conditions occurred.

The more modern windmills, especially the larger ones, secure protection in high winds usually by means which vary the pitch of the blades so as to reduce the rotor rotational speed to a safe range. Such systems require a complex rotor hub design which is usually associated with an outside power source to perform the pitch changing action. Systems of the type generally are expensive, and although the cost penalty may be justified in a large machine, it is not suitable for the more popular small windmills. Overspeed preventers for wind motors have also taken the form of mechanical arrangements for braking the rotor shaft, but such arrangements imply increased maintenance and reliability problems. In addition, the implementation of mechanical braking systems designed for fully automatic operation introduces an undesirable level of complexity into the system.

Inasmuch as windmills derive their motive power from the action of air flowing over their rotor surfaces, it would appear that aerodynamic means for preventing turbine overspeed would be the most direct and effective approach to the problem. As will be discussed subsequently in some detail, aerodynamic means for regulating the speed of wind rotors have been suggested in the prior art. In the instant invention, the aerodynamic brake comprises a simple spring-loaded plate which is hinged on the tip of the rotor blade such as to rotate outwardly under the influence of the level of centrifugal force resulting from overspeed conditions. In the range of rotational speeds of normal operation, the plate is retained by its spring in the stowed position with the edge of the plate presented to the direction of rotation. In this stowed position, the brake serves as a tip end-plate and significantly increases the efficiency of the rotor. When the rotor exceeds a predetermined rpm, centrifugal force on the brake plate overcomes the tension of the brake spring and the plate pivots to some deployed position that provides a drag on the rotor that is approximately proportional to the rotational overspeed.

OBJECTS OF THE INVENTION

It is an important object of the invention, therefore, to provide means for preventing overspeeding in windmills, which means utilize aerodynamic principles of operation.

It is another object of the invention to provide a windmill aerodynamic brake which is automatically actuated and does not require an outside power input for its operation.

It is a further object of the invention to provide a windmill overspeed preventer in which the means used to stop overrun serve to improve the aerodynamic efficiency of the windmill rotor in its normal operating condition.

It is yet another object of the invention to provide a windmill overspeed fluid brake which can be fitted readily on substantially any fluid-driven rotor.

A further object of the invention to provide a windmill overspeed preventer which has a minimum number of moving parts and which is operated by natural forces.

Another object of the invention is to provide a windmill overspeed preventer which is uncomplicated in construction such that its cost, installation, and maintenance are minimized.

Other and further objects of the invention will become apparent from the detailed description of the invention given in the accompanying specification and drawings.

DESCRIPTION OF THE PRIOR ART

The use of aerodynamic means which are actuated automatically by centrifugal force to regulate or prevent overspeed in windmills is known in the prior art as evidenced by J. R. Albers et al., L. Blumschein, F. C. Plucker, and J. C. McColly (U.S. Pat. Nos. RE 22,726; 1,537,401; 2,058,500; and 2,126,202, respectively). P. Deriaz (U.S. Pat. No. 2,751,190) shows that a similar arrangement is known in hydraulic turbines. Neither Albers nor Deriaz are believed to be particularly pertinent with respect to the instant invention, however, because their braking means are located at the hub of the rotor and are not mounted on the blades thereof. McColly is also not similar to the instant invention in that he teaches an air brake that is not mounted on the rotor blade, but which must be provided with a separate structure for its operation. Further, in McColly and Plucker, the air brake is actuated by a translational movement of its mechanism rather than by a pivotal travel of the air brake itself about an axis transverse to the rotor blade chord. Blumschein, it is seen, does provide a vane-type air brake that is deployed by centrifugal force about an axis transverse to the blade chord; however, Blumschein uses a vane on only one surface of the rotor blade and remotely from the blade tip. Thus, his brake does not produce drag at the maximum rotor radius for maximum torque effect nor does it, at its maximum actuated position, substantially destroy the air flow over the portion of the rotor blade that is normally very effective. In addition, unlike the air brake of the instant invention, the air brake of Blumschein in its stowed position does not act to restrict the spillage of airflow around the tip of the typical rotor. It is seen, therefore, that there is no teaching in the prior art of a centrifugally operated aerodynamic windmill overspeed preventer which is located at the blade tip with its hinge axis transverse to the rotor blade chord such that the device has maximum effectiveness when deployed for braking and which, in its stowed positon, acts to improve the aerodynamics of the rotor blade itself.

DESCRIPTION OF THE DRAWINGS

For the purpose of illustrating the invention, there is shown in the drawings the forms which are presently preferred, it should be understood, however, that the invention is not necessarily limited to the precise arrangements and instrumentalities here shown.

DESCRIPTION OF THE PREFERRED EMBODIMENTS

Figure 1:
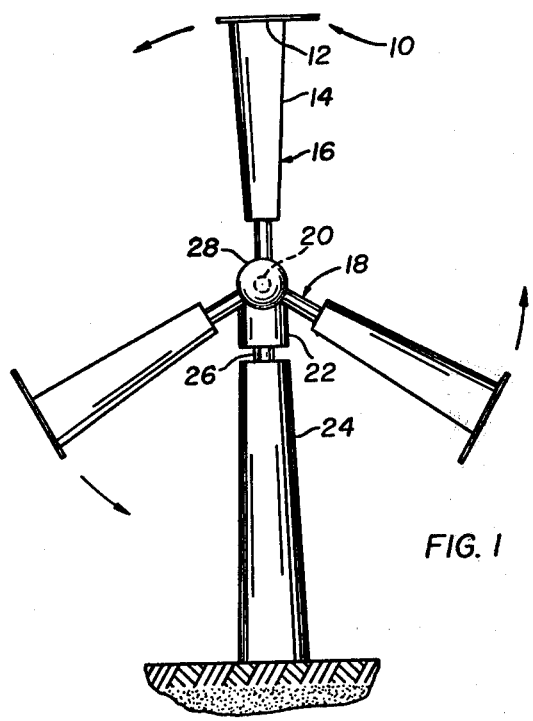
FIG. 1 is a front elevation view of a wind motor embodying an air brake in accordance with the invention.

Referring now to the drawings, FIG. 1 illustrates an embodiment of the air brake 10 of the invention mounted on the tips 12 of blades 14 of the rotor 16 of a windmill 18. As is well known, the rotor of the windmill is mounted on an output shaft 20 which is journaled in suitable bearings for rotation in the nose of a nacelle 22. Nacelle 22 is mounted on a column or tower 24 by means of the usual pivot arrangement 26 which allows the windmill to weathercock freely into the wind. A suitable power train (not shown) converts the energy output of the rotor in any known appropriate manner into a form suitable for utilization. The hub of the rotor can be provided with a fairing 28 which may house pitch changing means for the rotor if such means are provided. It will be appreciated that the air brake 10 of this invention can be utilized as the sole braking means for a windmill to prevent overspeed conditions; or one or even two other braking or speed governing means can be provided and the brake of this invention can be used as a backup system in the event of malfunctioning or failure of the other systems.

Figure 2:
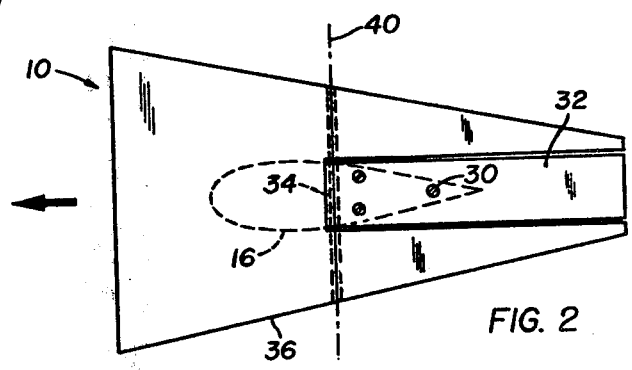
FIG. 2 is a top plan view of the rotor blade of a wind motor embodying an air brake of the invention.

As perhaps best shown in FIG. 2, each of the air brakes 10 is mounted on the tip 12 of rotor blade 16 by suitable means such as bolts or screens 30 which fasten a fixed mounting portion 32 of the brake to the rotor. Hinged to the fixed portion of the brake for rotation about pivot 34 is a pivoting brake plate 36 which has a range of angular travel from its stowed position illustrated in FIG. 3 to some fully deployed position as shown in FIG. 4 in which the surface 38 of the brake plate 36 is generally perpendicular to the direction of travel of the blade tip. To insure the proper action of the brake plate 36, the hinge line 40 of pivot 34 should be approximately perpendicular to the direction of rotor blade travel and to the plane of rotation of the rotor.

Means such as a tension spring 42 can be provided to resist deploying movements on the plate and to assist in returnig the plate to its stowed position when it has been displaced therefrom. To avoid the deployment of the brake plate until some predetermined minimum rotor speed is reached, it may be preferable to have spring 42 under some initial tension. Any suitable mounting arrangement can be used for the spring and can comprise brackets 44,46 fastened to the rotor blade 14 and surface 38 of the brake plate, respectively, to which the ends 48,50 of the spring are secured for operation.

It is preferable if the brake plate is balanced so that it tends to pivot toward its deployed braking position as a result of the action of the centrifugal force developed as a function of rotor speed. If the weight distribution of the plate does not favor this action, means such as a weight 52 can be employed to insure that the plate has a proper weight distribution.

Although the weight distribution of the plate should be such that the brake deploys as a result of centrifugal force, it is preferable if the plate planform and the selection of the hinge point are such that the brake plate is essentially aerodynamically balanced at all brake deflections between the stowed and fully deployed positions. In actual practice it is difficult to secure perfect aerodynamic balance, but satisfactory operation is obtainable if the design produces a small moment, particularly those tending to stow the brake plate.

In operation, when a predetermined rotor rotational speed is exceeded, centrifugal force on the hinged plate acts to pivot it about its hinge point into some deployed position. This action is opposed by the tension of spring 42 and, to a degree determined by its design, the aerodynamic moments of the plate. The plate will pivot into some deployed braking position which depends on the degree the rotor has exceeded its normal design speed to thereby provide an aerodynamic drag force which produces a braking action on the rotor roughly proportional to rotor overspeed. When the overspeed condition is corrected, aerodynamic moments and/or the tension of spring 42 will rotate the brake plate back into its stowed, normal running position.

Figure 3:
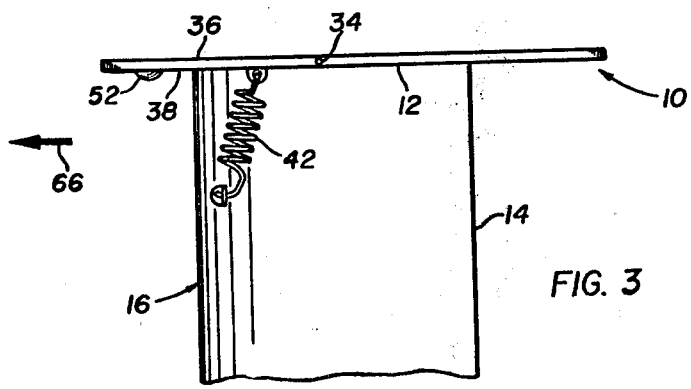
FIG. 3 is a side elevation of the air brake embodied in FIG. 2 illustrating the brake in its stowed position.
Figure 4:
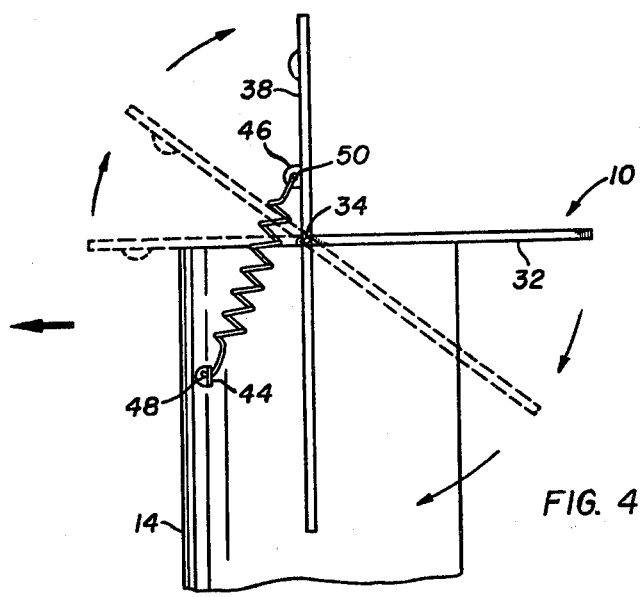
FIG. 4 is a side elevation of the air brake embodied in FIG. 2 illustrating the brake in a deployed positon.
Figure 5:
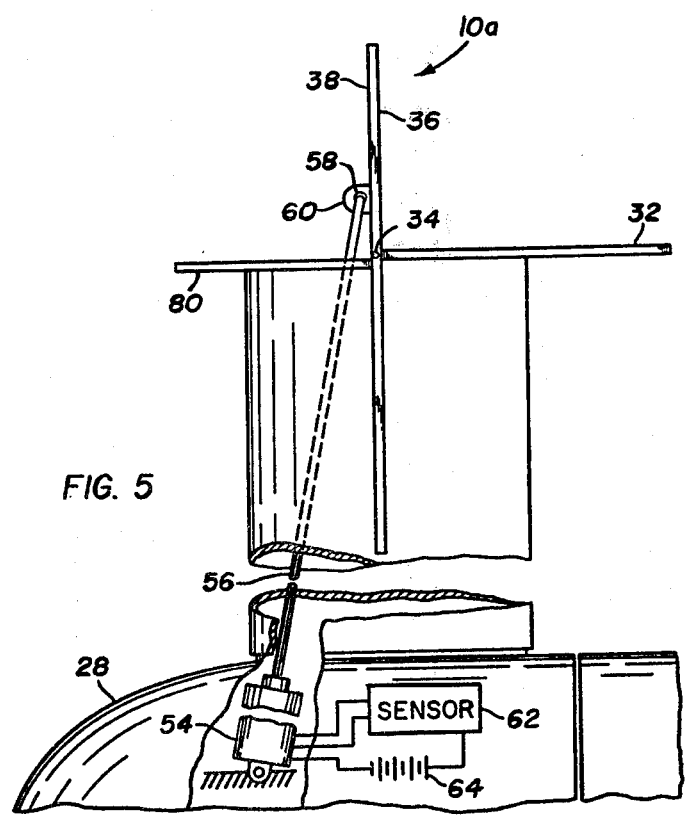
FIG. 5 is a diagrammatic side elevation of a rotor blade of a wind motor showing a further embodiment of an air brake of the invention.
Figure 6:
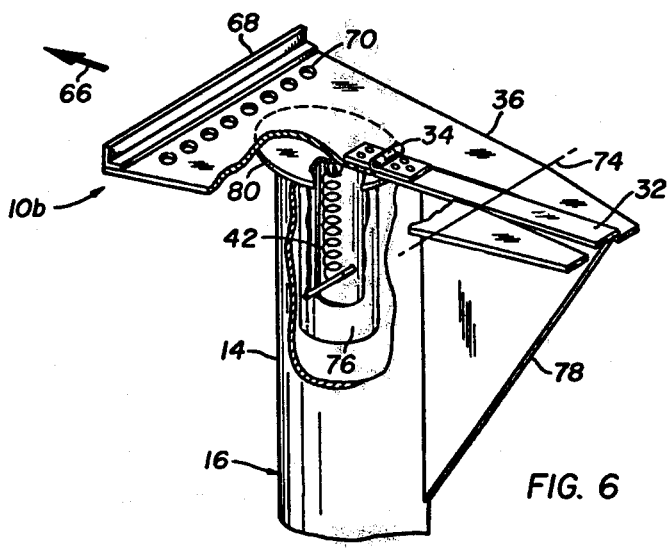
FIG. 6 is a perspective view partially in section of a further embodiment of an air brake of the invention.

It will be appreciated that it is within the scope of this invention to employ electro-mechanical or other suitable means to effect the required deploying or stowing of the brake plate rather than the actuation system of the FIGS. 2-4 embodiment of the invention. As illustrated in FIG. 5, an alternate embodiment of the brake (10a) can comprise a pivoting brake plate 36 which is hinged about a pivot 34 associated with a fixed mounting portion 32 of the brake. Actuation of the brake is by means of a suitable actuator 54 driving the brake plate 36 (illustrated in its fully deployed position in FIG. 5) by means of a drive link 56 whose end 58 is connected pivotally to bracket 60 mounted on surface 38 of the brake plate 36. A suitable rotor speed sensor 62 which incorporates known means to sense an overspeed condition of the rotor is used with suitable circuitry connected to a source 64 of electric power to control the operation of actuator 54. Although electro-mechanical means are used to actuate the FIG. 5 embodiment of the brake of this invention, it is within the teachings of the invention to use a hydraulic or pneumatic analog thereof. Actuator 54 and the sensor 62 can be located in any appropriate position in operative association with the brake 10a as, for example, in the fairing 28 encasing the hub of the rotor.

In operation, the rotational speed of the rotor is monitored by sensor 62 which, when a predetermined speed is exceeded, supplies electrical energy to the actuator 54 to drive the link 56 in the direction of the rotor blade tip. This movement of the link causes the brake plate to swing about its pivot 34 into some deployed position which is proportional to the amount or rotor overspeed.

The drag created by the deployed brake plate serves to restrict the speed of the rotor to keep it within its design limitations. When the rotational speed of the rotor slows because of brake drag or some other factor such as a moderation of the wind, this speed change is detected by the sensor which, in turn, controls the actuator to effect the required positioning of the brake plate in keeping with the conditions prevailing.

The braking action of the air brake of my invention is extremely effective, principally for two reasons: Firstly, because the brake is located at the rotor blade tip, it will be seen that the drag produced by the brake is at the greatest possible rotor radius such that a maximum torque effect is achieved. Secondly, because when the brake plate is deployed (See FIGS. 3 and 5), the trailing edge aft of the hinge line is rotated inwardly such that it is interposed over the tip area of the rotor blade. The brake, therefore, not only produces a drag at the maximum possible moment arm but, at the same time, it destroys efficient air flow over a portion of the blade that is normally very effective in driving the rotor.

On the other hand, in the stowed, normal-rumming position, the brake acts as a tip or end plate to restrict the airflow spillage that generally occurs at the tip of the normal rotor blade. This action serves to increase the efficiency of the rotor significantly because the rotor tip sections provide the greatest power and losses in that region are critical.

As stated previously, it is preferable if the plate planform (as well as the hinge point) are such that the brake plate is essentially aerodynamically balanced through the entire range of its deflection. The desired aerodynamic characteristics are attainable with a wide variety of plate planforms, such as that shown in FIG. 2. That planform can be described as having a low aspect ratio shape with a ratio of fore and aft length to width of 1 or greater. To provide for a fence or end plate effect on the airflow over the rotor blade, the edges of the plate should extend as shown beyond the contour of the rotor blade itself. In this invention, the air brake will deflect to provide a braking action proportionally to the overspeed rpm of the rotor. For maximum efficiency in operation, the end plate weight distribution, planform, and the hinge point must be selected so that its deflection is a function of centrifugal force and not of the relative airspeed at the tip of the rotor blade. The planform considerations are satisfied by selecting a plate configuration that provides zero, or a very small variation of moment about the pivot regardless of airspeed. This air moment consideration is important in assuring that the brake deflection is proportional to rotor overspeed. I have found that a triangular or delta planform, such as illustrated in FIG. 2, produces a stable pitching moment with deflection that satisfies the requirements.

Figure 7:
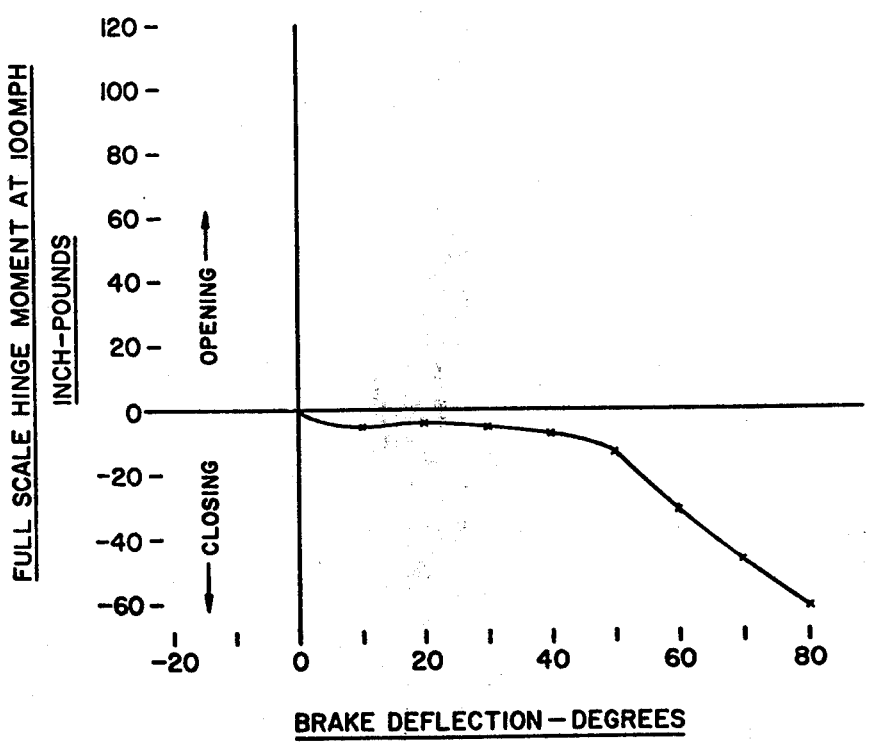
FIG. 7 is a plot of brake pivot hinge moments as a function of brake deflection of an air brake of the invention.

It will be recognized the air brake of this invention is an aerodynamic device that is amenable to aerodynamic palliatives in its design. Thus, known techniques such as leading edge vents, spoilers, or trailing edge trim tabs and the like, can be used to produce the desired moments and such techniques thus fall within the scope of this invention. For example, air brake 10b installed on a rotor turning in a direction indicated by directional arrow 66 can be provided with a leading edge spoiler 68, vent holes 70 pierced through the brake plate 36 parallel to the leading edge thereof, and the trailing edges 72 of the plate along line 74 can be bent 15° relative to the plane of the plate and in the direction of the hub of the rotor to thereby act as a "trim tab". Air brake 10b has the usual fixed portion 32, hinge 34, tension spring 42 (mounted in a spring tube arrangement 76), and the like and can be provided with a tip gusset 78 if such is required. As indicated in the plot of FIG. 7 which gives the hinge moment as a function of brake deflection, an air brake of a design similar to brake 10b demonstrated a very slight closing moment at low brake deflections, along with a stable break at about 45° deflection of the brake that was followed by a stable increase in moment at higher deflections. The spring force variation of tension spring 42 should be matched to these aerodynamic characteristics of the brake to obtain a stable variation of brake deployment throughout its range of travel.

It will also be appreciated that aerodynamic palliatives can be incorporated in the rotor blade itself to achieve the desired pivot moments of the brake. Such means can take a variety of forms such as, for example, a splitter plate 80 fixed on the rotor blade as at the leading edge thereof.

Although shown and described in what is believed to be the most practical and preferred embodiments, it is apparent that departures from the specific method and apparatus described will suggest themselves to those skilled in the art and may be made without departing from the spirit and scope of the invention. I, therefore, do not wish to restrict myself to the particular methods illustrated and described, but desire to avail myself of all modifications that may fall within the scope of the appended claims.

Having thus described my invention, what I claim is:

1. In a wind-driven motor having a rotor supported for rotation about an axis, an aerodynamic brake mounted on the tip of each blade of said rotor, each of said brakes comprising:

a brake plate pivotally attached to the tip of said blade for relative pivotal deployment therewith;

means responsive to centrifugal forces resulting from overspeed conditions of said rotor for pivotally deploying said plate between a stowed position in which the planform surfaces thereof are substantially parallel to the circumference generated by said blade tip to various deployed positions which extend greater surface areas of said plate into the relative airstream to create levels of drag proportional to said centrifugal forces whereby the rotational speed of said rotor is affected thereby such that the rotor overspeed condition is remedied, said means responsive to centrifugal forces comprising a brake plate weight distribution in which the greater mass is forward of the pivot hinge line of said plate and in the direction of rotation of said rotor blade; and means for restoring said plate from said deployed positions to said stowed position in response to reductions in said centrifugal forces.

2. The aerodynamic brake as defined in claim 1 wherein the pivotal axis of the brake plate is perpendicular to the plane of rotation of the rotor blade.

3. The aerodynamic brake as defined in claim 1 wherein the means for restoring said plate to said stowed position is a spring.

4. The aerodynamic brake as defined in claim 3 wherein the restoring means is a tension spring in biasing association between the rotor blade and the brake plate.

5. The aerodynamic brake as defined in claim 1 wherein the restoring means is a brake plate planform in which the aerodynamic pitching moments on said plate in its deployed positions are in a direction tending to pivot said plate into its stowed position.

6. The aerodynamic brake as defined in claim 1 wherein the planform of the brake plate extends beyond the contours of the rotor blade section whereby said plate in its stowed position serves as a tip plate to restrict airflow spillage around the end of said rotor blade such that the aerodynamic efficiency of said blade is improved thereby.

7. The aerodynamic brake as defined in claim 1 wherein the hinge line of the brake plate is located intermediate the leading and trailing ends thereof such that the leading end portions of said plate in its deployed positions project outside the tip path of the rotor.

8. The aerodynamic brake as defined in claim 7 wherein the trailing end of said plate is cut away along the plate longitudinal axis, the cut-away portion being sized to accommodate the rotor blade such that in the deployed positions of the brake, portions of its trailing end are pivoted over the surfaces of said rotor blade whereby the airflow thereover is influenced.

9. The aerodynamic brake as defined in claim 5 wherein the brake plate has a delta planform with the base of the delta comprising the leading edge of said plate.

10. The aerodynamic brake as defined in claim 9 wherein the plate planform has a low-aspect ratio with the ratio of fore and aft length to width of at least 1.

11. The aerodynamic brake as defined in claim 5 wherein the leading edge of the plate is provided with a spoiler such that the airflow over the plate is influenced thereby.

12. The aerodynamic brake as defined in claim 11 wherein the spoiler is a rigid strip extending perpendicular to the planform surface of the plate at least on one side thereof.

13. The aerodynamic brake as defined in claim 5 wherein the leading edge portion of the plate is provided with at least one vent intermediate the width thereof.

* * * * *